United States Patent
Li et al.

(10) Patent No.: US 9,478,237 B2
(45) Date of Patent: Oct. 25, 2016

(54) WORK PIECE CONTACT PAD WITH CENTERING FEATURE

(71) Applicant: Seagate Technology LLC, Cupertino, CA (US)

(72) Inventors: Leping Li, Bloomington, MN (US); Jeffrey Robert O'Konski, Savage, MN (US); Saravuth Keo, Prior Lake, MN (US); Pramit P. Parikh, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 318 days.

(21) Appl. No.: 14/030,412

(22) Filed: Sep. 18, 2013

(65) Prior Publication Data

US 2015/0077148 A1    Mar. 19, 2015

(51) Int. Cl.
*G01R 31/00* (2006.01)
*G11B 5/31* (2006.01)

(52) U.S. Cl.
CPC .................. *G11B 5/3169* (2013.01)

(58) Field of Classification Search
CPC ................................................... G11B 5/3169
See application file for complete search history.

(56) References Cited

U.S. PATENT DOCUMENTS

| | | | |
|---|---|---|---|
| 5,597,737 A * | 1/1997 | Greer | G01R 31/2831 438/17 |
| 5,793,598 A | 8/1998 | Watanabe et al. | |
| 6,040,700 A | 3/2000 | Berar | |
| 6,096,567 A | 8/2000 | Kaplan et al. | |
| 6,111,421 A | 8/2000 | Takahashi et al. | |
| 6,132,290 A * | 10/2000 | Sugiyama | B24B 37/00 451/10 |
| 7,221,177 B2 | 5/2007 | Komatsu et al. | |
| 7,352,198 B2 | 4/2008 | Nayak et al. | |
| 7,622,939 B2 | 11/2009 | Nayak et al. | |
| 2005/0128638 A1* | 6/2005 | Koeppe | G11B 5/127 360/128 |
| 2008/0238455 A1* | 10/2008 | Ishii | G01R 31/2887 324/750.24 |
| 2014/0203438 A1* | 7/2014 | Chen | H01L 24/05 257/761 |

FOREIGN PATENT DOCUMENTS

| | | | |
|---|---|---|---|
| JP | 02-95572 A | | 4/1990 |
| JP | 08-129716 A | | 5/1996 |
| JP | 2004193299 A | * | 7/2004 |
| JP | 2009-123979 A | | 6/2009 |

* cited by examiner

*Primary Examiner* — Daniel Miller
(74) *Attorney, Agent, or Firm* — Hall Estill Attorneys at Law

(57) ABSTRACT

A data storage device may be tested during or after manufacture by a testing device that may have at least a work piece with at least one contact pad concurrently contacting bottom and sidewall surfaces of a probe tip with a centering feature of the at least one contact pad.

20 Claims, 4 Drawing Sheets

WORK PIECE CONTACT PAD WITH CENTERING FEATURE

SUMMARY

In assorted and non-limiting embodiments of the present disclosure, a testing device may have at least a work piece with at least one contact pad concurrently contacting bottom and sidewall surfaces of a probe tip with a centering feature of the at least one contact pad.

DETAILED DESCRIPTION

Progression of data storage devices towards heightened data storage capacity and data access speeds to keep up with modern computing environments corresponds with a miniaturization of data storage components like magnetically responsive sensors, laminations, and shields. Reducing the physical size of data storage components has decreased manufacturing and operational tolerances, which consequently increases manufacturing complexity and hinders operational yield when tolerances are not met.

The production of components with reduced tolerances can stress the manufacturing and testing process as smaller dimensioned equipment can be prone to inadvertent volatility due to environmental and handling conditions. These issues have prompted industry to emphasize manufacturing and testing equipment to reliably produce reduced form factor data storage components and devices.

Emphasis on manufacturing and testing smaller components has rendered a work piece that has at least one contact pad that contacts bottom and sidewall surfaces of a probe tip with a centering feature of the contact pad. With the centering feature providing concurrent physical and electrical contact to the bottom and sidewall surface of the probe tip, the downward force necessary to maintain contact while the work piece moves during testing and manufacturing a data storage component is minimized. Such a reduction in contact force can consequently insure the reliability of the manufacturing process and optimize lapping results by reducing stress on the workpiece. For instance, bar lapping to a predetermined thickness can induce vibration and movement in one or more electronic lapping guide (ELG) probes extending from the probe card to ELG contact pads of a work piece and jeopardize the integrity and accuracy of the ELG reading, which can be important to the success in adaptive control of the lapping processing.

Figure 1:
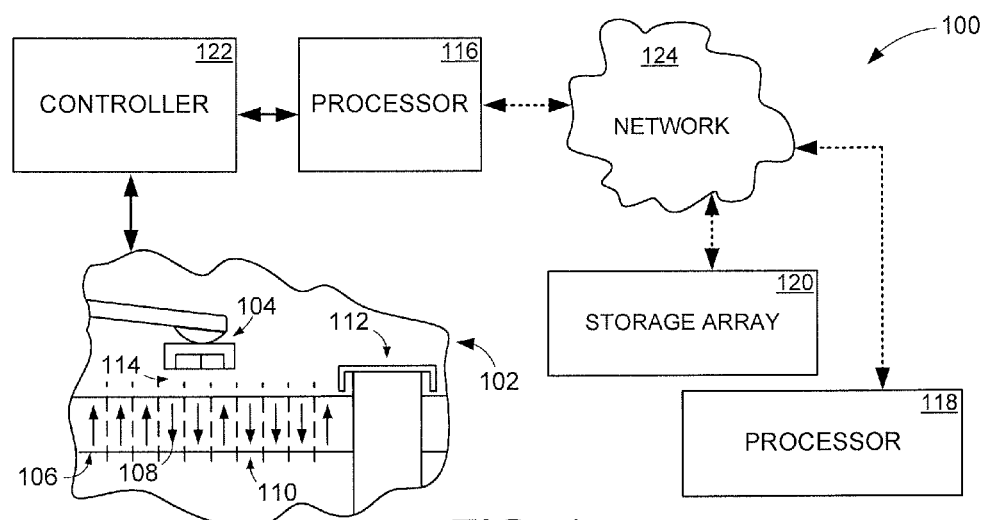
FIG. 1 is a block representation of an example portion of a data storage device.

FIG. 1 provides an exemplary data storage system 100 configured and operated in accordance with some embodiments. The data storage system 100 is shown in a non-limiting configuration with a data transducing assembly 102, such as the assembly shown in FIG. 1, being equipped with a slider having a transducing head 104 that may have at least one data reading and writing means that can respectively be positioned over a variety of locations on a magnetic storage medium 106, such as over one or more stored data bits 108 organized in a predetermined pattern 110 like concentric data tracks or bit pattern media.

The storage medium 106 can be attached to one or more spindle motors 112 that rotate the medium 108 to produce an air bearing 114 on which the slider and transducing head 104 flies to access predetermined portion of the medium 106. In this way, one or more local 116 and remote 118 processors can provide controlled motion of the slider and transducing head 104 and spindle 112 to adjust and align the transducing head 104 with selected data bits 108. The advent of wireless computing has provided remote access to one or more processors 118 and storage arrays 120 from a controller 122 via a network 124.

Figure 2:
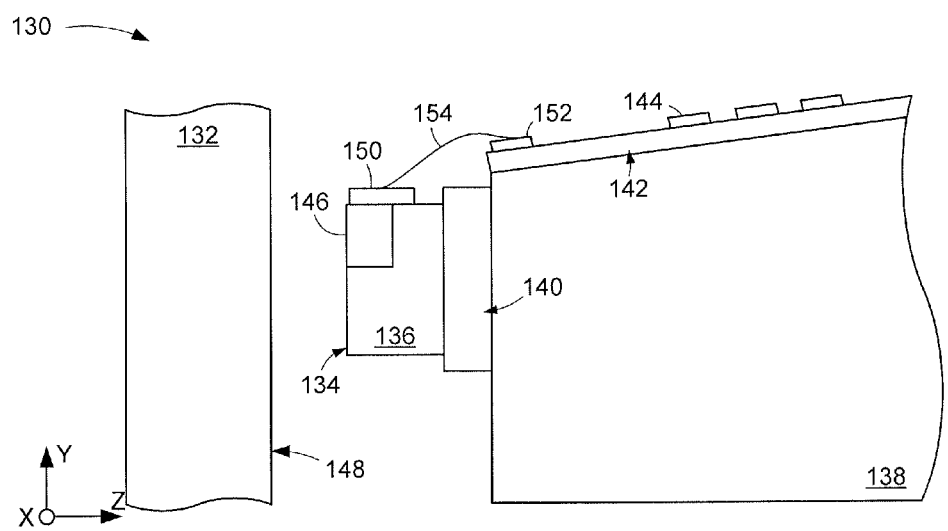
FIG. 2 displays a side view block representation of an example tooling assembly configured and operated in accordance with various embodiments.

While any component of the data storage system 100 can be tested and manufactured in an unlimited variety of manners, assorted embodiments utilize the example tooling assembly 130 of FIG. 2, which is displayed as a side view block representation. The tooling assembly 130 can have at least one tool 132 that selectively engages portions of a work surface 134 to provide a predetermined planarity. The work surface 134, in the embodiment shown in FIG. 2, is a rowbar 136 that is secured to a carrier 138 by an adhesive 140. The carrier 138 houses a probe card 142 that allows structural and operational information from the tool 132 and work surface 134 to be read via contact with an electrical contact 144.

Assorted embodiments comprise the rowbar 136 of a plurality of separated transducing means 146, such as a resistive sensor, that are subsequently processed into slider heads after the work surface 134 is sufficiently flat and close to a predetermined target position via lapping with the tooling surface 148 of the tool 132. Through controlled articulation of the work surface 134 with respect to an abrasive tooling surface 148, the area of cross-section of one or more embedded transducing means 146 can be reduced to be a substantially planar target value, which corresponds to removal of a given amount of material that results in more accurate manufacturing and data storage performance.

Although blind engagement of the rowbar 136 and tooling surface 148 can be practiced without any real-time transducing means 146 structural condition, such engagement can result in too little or too much of the transducing means 146 containing surface material being removed and degraded data storage performance. Hence, the amount of material removed from at least one transducing means 146 is monitored in-situ by connecting one or more lapping guide pads 150 to a corresponding number of ELG contact pads 152 on the probe card 142. The continuous or routine monitoring of the amount of material being removed from the embedded ELG of the transducing means 146 through contact with the abrasive tooling surface 148 can be used to accurately remove a planned amount of surface material to a targeted thickness that corresponds with a substantially planar transducing sidewall.

However, the wirebond 154 connection between the slider lapping guide pad 150 and the probe card contact pad 152 can pose a number of difficulties as the physical dimensions of the embedded ELG transducing means 146 and rowbar 136 decrease either to increase the number of sliders per bar or to increase other process space, such as embedding a laser for heat assisted magnetic recording (HAMR) implementations. The bonding of the wirebond 154 to the probe card contact pad 152 occupies a portion of the pad on the slider and on the probe card that is lost in the event the wirebond 154 corrupts, which leaves less contact surface area to connect subsequent wirebonds, such as actuated kiss lap (AKL) wirebonds. The reduced physical area of the lapping guide pads 150 further demands increased wirebond 154 precision that is more challenging and expensive to connect.

The removal of wire bonded loops after various steps, such as AKL and one step lap (OSL), can leave behind residue of the bonding wires on both the lapping guide pads 150 and on the probe card contact pads 152. Furthermore, the removal process itself may result in metal wire fragments embedding in the sliders, such as the overcoat portion, causing contamination that is difficult to eliminate and degrades performance yield. These issues have spawned interest in bondingless connections between the probe card 142 and lapping guide pad 150. A bondingless connection can take an unlimited variety of forms, but in some embodiments has been a wire probe that extends from the contact pad 152 to contact the lapping guide pads 150 on the slider bar. That is, the physical contact between the probe card and lapping guide pads 150 establishes electrical connection without the pad 150 being wirebonded to the probe card.

It can be appreciated that the elimination of a bonded connection between a probe tip and the lapping guide pad 150 can allow efficient, repeatable electrical contact without the need to form and remove a wirebond 154. In yet, the reduction in physical size of the lapping guide pad 150 makes reliable bondingless contact between the pad 150 and a probe tip difficult as the spring force of the probe tip can overcome the frictional force of the pad 150. Similarly, the lack of a fixed connection of the pad 150 and probe tip can result in inadvertent disconnection due to vibration and movement of the rowbar 136 and compression of the bar bonding adhesive 140, such as when the rowbar 136 contacts the tooling surface 132 during initial contact and subsequent lapping operations.

Figure 3:
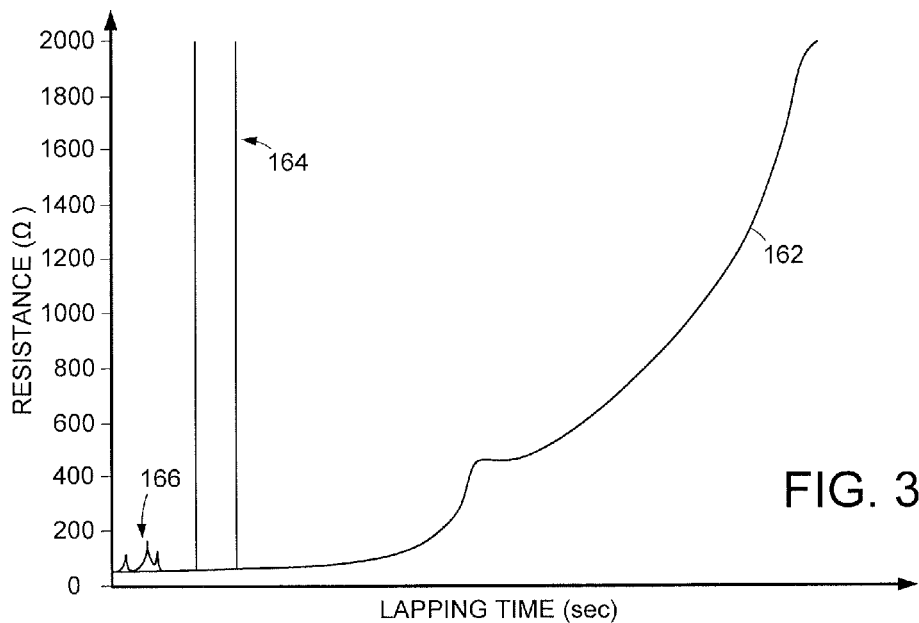
FIG. 3 plots operational data from an example testing assembly operated in accordance with some embodiments.

FIG. 3 graphs example testing data for a testing assembly utilizing a bondingless connection. Line 162 plots how a bondingless probe tip connection allows predictable increases in resistance as an embedded ELG portion of the transducing means is lapped and material is removed. However, the lack of secure contact between the probe tip and contact pad can exhibit noise spikes 162 and 164 that taint the testing data provided by line 162. The noise spikes 164 and 166 may occur for any number of reasons, but are contemplated to arise from the probe tip moving, as illustrated by noise spikes 166, and losing electrical contact altogether, as displayed by open noise spikes 164.

Figure 4A:
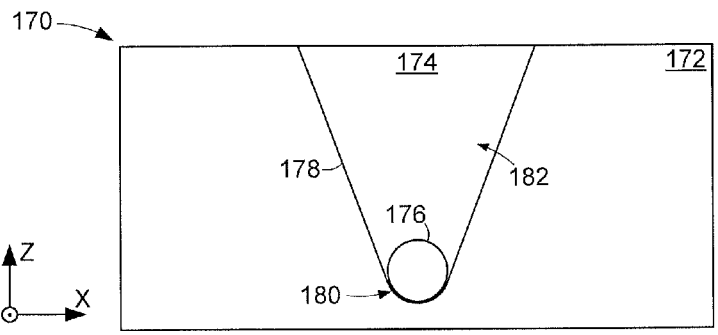
FIGS. 4A and 4B respectively provide top and cross-sectional block representations of portions of a testing assembly capable of being incorporated into the tooling assembly of FIG. 2.
Figure 4B:
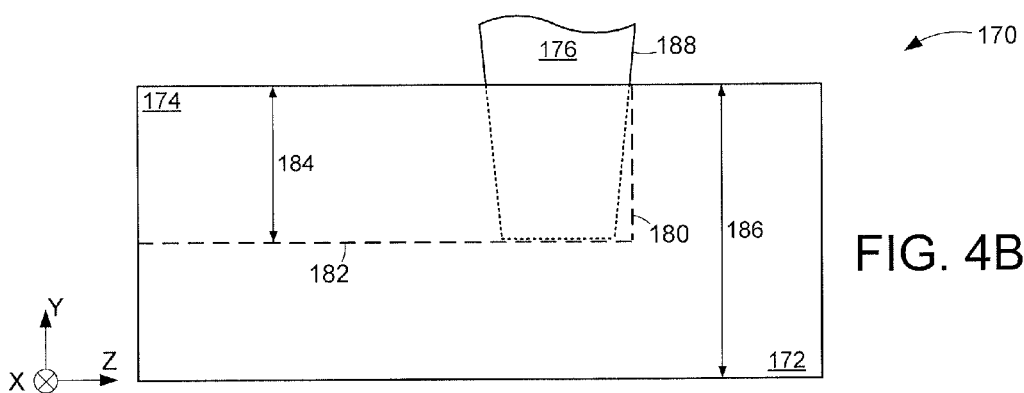

Accordingly, an electrical lapping guide pad on the bar can be configured with a centering feature that provides simultaneous physical and electrical contact with bottom and sidewall surfaces of a bondingless probe tip. FIGS. 4A and 4B respectively illustrate top and side block representations of an example testing device 170 configured and operated in accordance with various embodiments to have a lapping guide (ELG) pad 172 preconfigured with a centering feature 174 to optimize contact with a bondingless probe tip 176, such as a wire probe continuously extending from a contact pad of a probe card.

FIG. 4A shows how the centering feature 174 can be shaped with linear sidewalls 178 angled towards the center of the ELG pad 172 and meeting at a curvilinear transition surface 180 that is shaped to match the size and shape of the probe tip 176, in some non-limiting embodiments. The matching of the shape of the transition surface 180 to the probe tip 176 can ensure concurrent sidewall and bottom probe tip surface contact that optimizes testing device 170 operation.

The linear sidewalls 178 can be tuned to an unlimited variety of angles and depths to define the centering feature 174 in diverse configurations that can guide and secure a range of different probe tip 176 sizes and shapes to a predetermined location on the ELG pad 172 where concurrent bottom and sidewall surface contact is most reliable. The linear sidewalls 178 may further dictate the shape of a floor 182 surface of the centering feature 162. FIG. 3B displays how the floor 162 can be set to a uniform depth 184 that is less than the thickness 166 of the ELG pad 172 to allow the probe tip 176 to easily translate to the transition surface 180.

In some embodiments, the transition surface 180 is angled to match the tip sidewall 188 angle while other embodiments make the transition surface 180 and tip sidewall 188 angles dissimilar to contact the tip sidewall 188 with a point at the apex of the centering feature. The ability to tune the position, size, and shape of the centering feature 174 can allow physical and electrical contact to be made between the probe tip 176 and ELG pad 172 without adhesives or fasteners and without excessive downward force that could compromise the integrity of the probe tip and the testing data provided as a result of the probe tip 176 being electrically connected with the ELG pad 172.

Figure 5A:
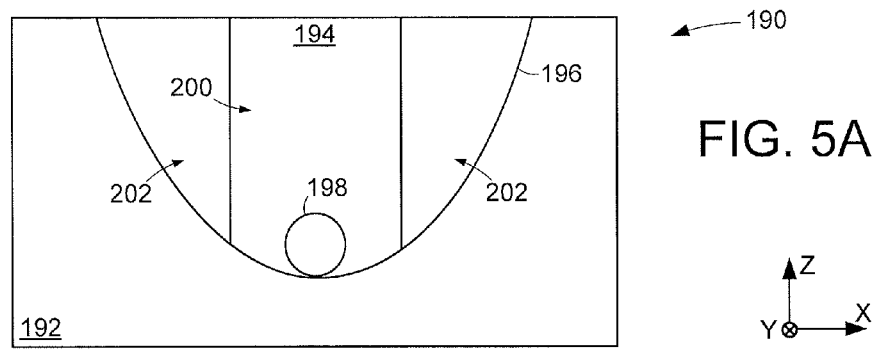
FIGS. 5A and 5B respectively show top and cross-sectional block representations of portions of a test assembly configured in accordance with various embodiments.
Figure 5B:
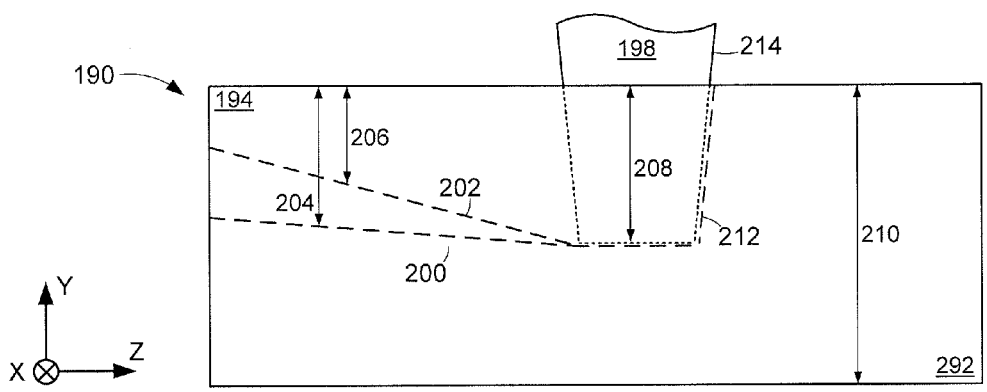

FIGS. 5A and 5B respectively display top and side block representations of another example testing device 190 that is tuned differently than the device 170 of FIGS. 4A and 4B in accordance with various embodiments. The top view of FIG. 5A shows how an ELG pad 192 can have a centering feature 194 with a continuously curvilinear sidewall 196 that has a radius of curvature that is greater than the probe tip 198 located at the apex of the sidewall 196. The continuously curvilinear sidewall 196 may more efficiently guide the probe tip 198 towards the apex of the centering feature 194 than the linear sidewalls 178 of FIG. 4A.

The floor of the centering feature 194 can also be tuned, as shown in FIGS. 5A and 5B, to have low 200 and high 202 regions with differing elevations 204 and 206, respectively. FIG. 5B illustrates how the high regions 202 can be sloped with a varying depth 206 along the Z axis towards a predetermined apex of the centering feature 194 that has a depth 198 that matches the depth 204 of the low regions 202 while continuously extending to less than the entire thickness 210 of the contact pad. Various embodiments can further tune the low 200 and high 202 regions to slope at similar or dissimilar angles towards the apex with linear, stepped, and curvilinear floor surfaces.

The probe tip 198 can be secured at the predetermined apex of the centering feature 194 by being the lowest point in the feature 194 and may also be secured by matching the configuration of the transition surface 212 with the sidewall surface 214 of the probe tip 198. The combination of tuned elevation, sidewall angles, and feature shape can increase the probability that the probe tip 198 will find its way to the apex of the centering feature 194 where simultaneous bottom and sidewall contact with the ELG pad 192 can be maintained during a variety of movements and vibrations. Such increased probability contrasts contacting a flat contact pad surface exclusively with the bottom surface of the probe tip 198, which can be susceptible to movement and compromised testing data due to the spring force of the tip 198 exceeding the friction of the pad 192.

Figure 6:
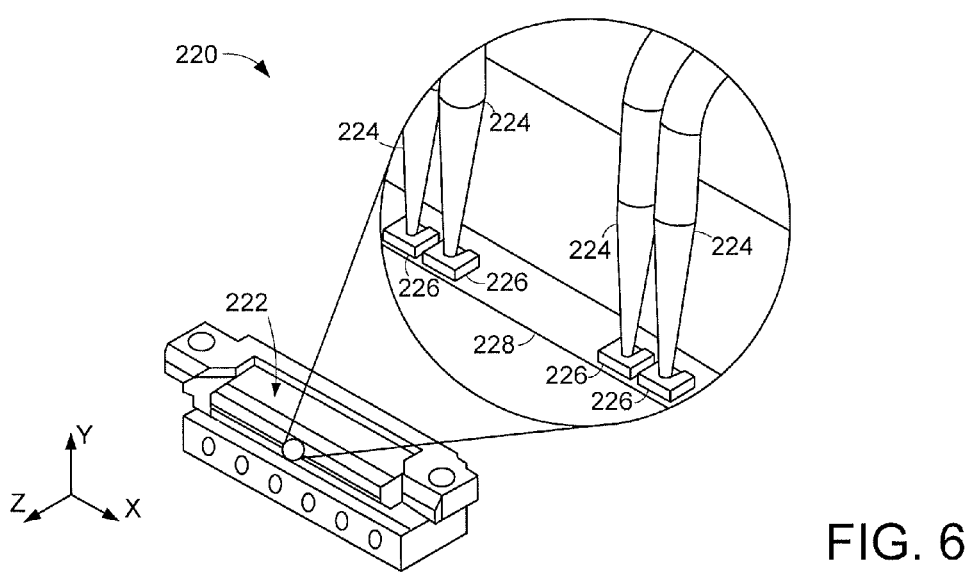
FIG. 6 shows a perspective view block representation of an example testing assembly configured in accordance with various embodiments.

The ability to tune a contact pad with a centering feature adapted to reliably secure a testing probe without adhesive or fasteners allows a probe card to be configured with multiple different contact pads customized to the size, shape, and testing function of different probes. FIG. 6 displays a perspective view block representation of an example lapping assembly 220 in which a probe card 222 engages a number of different testing probes 224 with independent contact pads 226 on a testing bar 228. Each contact pad 226 is tuned to accommodate the particular testing probe 224. That is, each contact pad 226 has a centering feature that may match or be dissimilar to the other contact pads 226 present on the probe card 222.

By configuring the respective contact pads 226 with differently tuned centering features, a plurality of testing functions and equipment can be secured with both physical and electrical contact. Such tuned configuration of the various contact pads 226 can allow relatively large displacement between the probes 224 and contact pads 226, such as from pressure induced contraction, to occur without concern for the integrity of the testing data. The secure probe 224 confinement may further allow the contact pads 226 to be minimized in size to one or different surface areas, such as 45 rim, which may be useful in applications like heat assisted magnetic recording (HAMR).

Figure 7:
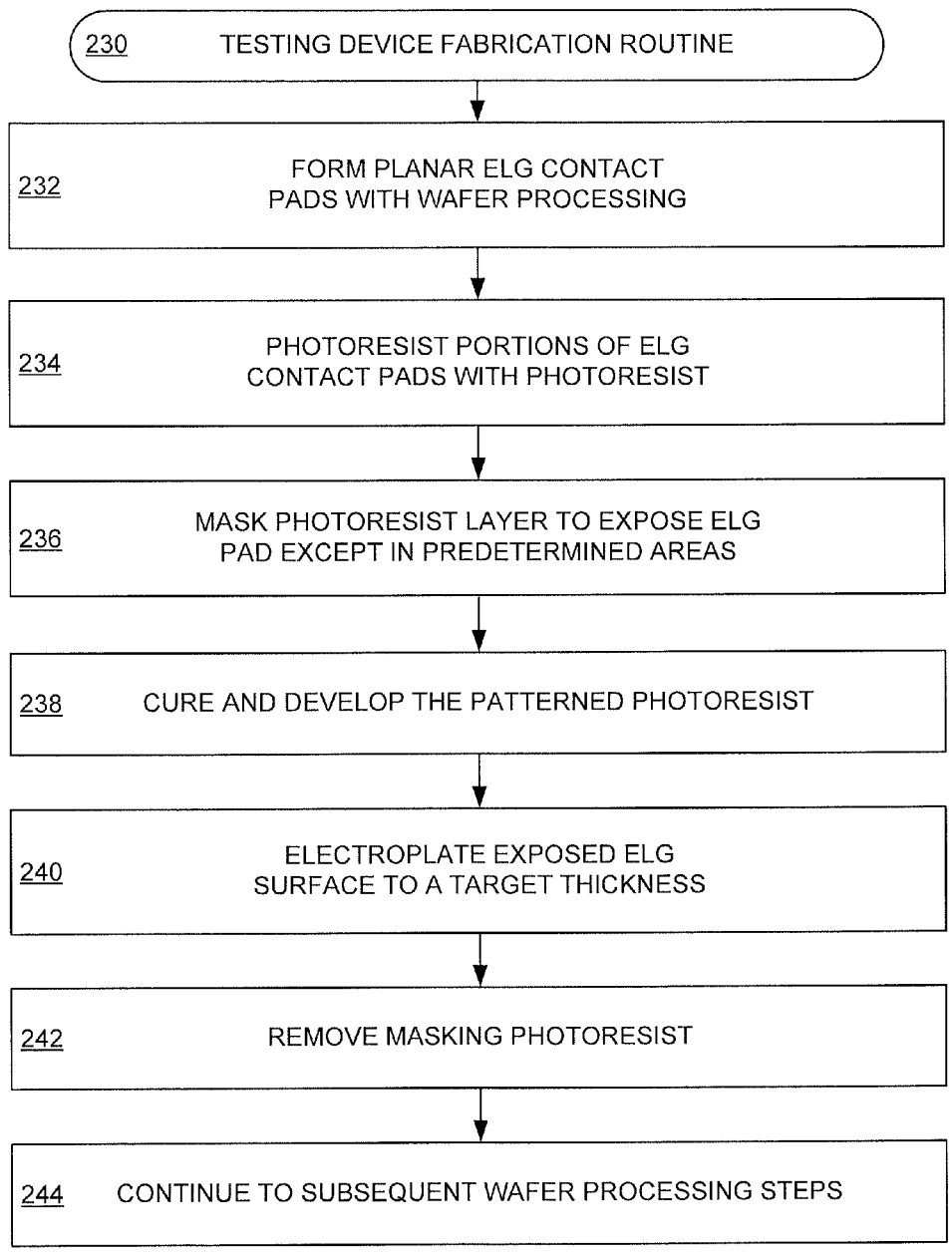
FIG. 7 provides a flowchart of a testing device fabrication routine conducted in accordance with some embodiments.

FIG. 7 is a logical map of an example testing device fabrication routine 230 that is conducted in accordance with various embodiments. Step 232 initially forms one or more planar electronic lapping guide contact pads with wafer processing means, such as lithography and cleaning means. The contact pads may be constructed of any predetermined material, such as conductive pure or alloy material, with a predetermined thickness that may be uniform or varying on a work piece. Step 232 may be conducted in an unlimited variety of manners, such as electroplating. The layer deposited in step 232 may further be configured with an unlimited number of different exterior shapes with circumferences that define a predetermined areal extent like 35-95 µm.

With the layer deposited with predetermined shape, material, and thickness, portions of the layer are photoresisted in step 234 in a predetermined pattern that is subsequently masked to expose some, but not all, portions of the ELG pad in step 236, such exceptions can be portions of the centering feature.

Next in step 238, the patterned photoresist is cured and developed so that step 240 can then electroplate material onto the ELG surface up to a target thickness. The removal of the masking photoresist is conducted in step 242 and is not limited to a particular process.

Step 244 continues the fabrication of a testing device with subsequent wafer processing steps that are not restricted, but may comprise etching, lapping, and polishing to produce a curvilinear or linear sidewall of a particular depth, such as 7 µm. Step 244 may involve a number of different processing steps that construct a variety of different floor surface elevations, which may be similar or dissimilar from regions 190 and 192 of FIGS. 4A and 4B. The completion of a centering feature with designed shape, floor elevation, and sidewall depth can then be engaged by a probe tip to establish electrical contact. The tuned configuration of the centering feature can allow efficient and harmless movement of the ELG probe tip to a predetermined position, such as the apex and transition surface of the feature, so that the bottom and sidewall surfaces of the ELG probe tip can concurrently be secured and contact the contact pad.

While the ELG probe tip is secured, various manufacturing and testing operations can be conducted and monitored on a data storage component contacting the ELG probe. For example, a lapping operation can be conducted on a ferromagnetic layer of a magnetoresistive lamination while the resistance in the ELG probe is monitored to determine the thickness of the ferromagnetic layer. It should be noted that routine 230 is not limited to the various steps and decision shown in FIG. 6 as any aspect can be omitted, changed, and added, without restriction. For instance, the routine 230 may further incorporate a step before step 244 that removes portions of the ELG contact pad to establish the centering feature that directs a ELG probe tip towards a predetermined location on the contact pad.

Through the configuration of at least one contact pad with a tuned centering feature, physical and electrical contact with the ELG probe can be secured without adhesive or fasteners. The secure contact may further allow less force to be used on the probe card containing the contact pad and consequently the ELG probe. Moreover, the ability to more safely and efficiently facilitate contact between a testing probe and contact pad allows manufacturing of a data storage component to be optimized for time and reliability as the testing equipment experiences less stress due to the simultaneous bottom and sidewall surface contact between the testing probe and contact pad.

What is claimed is:

1. An apparatus comprising:
 a work piece comprising a contact pad having a predefined feature with bottom and sidewall surfaces; and
 a bondingless probe tip concurrently contacting the bottom and sidewall surfaces, the bottom surface tapered at a greater than zero angle to provide varying depth for the feature relative to a top surface of the contact pad.

2. The apparatus of claim 1, wherein the bondingless probe tip contacts the bottom and sidewall surfaces without adhesives and fasteners.

3. The apparatus of claim 1, wherein the bondingless probe tip physically and electrically contacts the bottom and sidewall surfaces of the contact pad.

4. The apparatus of claim 1, wherein the feature continuously extends from a single side of the contact pad to a center of the contact pad.

5. The apparatus of claim 4, wherein the feature is shaped with multiple linear sidewalls.

6. The apparatus of claim 4, wherein the feature is shaped with at least one curvilinear sidewall.

7. The apparatus of claim 1, wherein the probe tip comprises at least one surface continuously tapered at a non-normal angle.

8. The apparatus of claim 1, wherein the contact pad has an areal extent of 35 µm.

9. A testing device comprising:
 a work piece comprising a contact pad; and
 a bondingless electronic lapping guide (ELG) probe tip concurrently contacting a first bottom surface and sidewall surface of a feature of the contact pad, the first bottom surface being continuously linear and tapered at a first angle, the contact pad comprising a second bottom surface extending from the first bottom surface at a second angle, the first and second angles being different and configured to provide varying depth for the feature relative to a top surface of the contact pad.

10. The testing device of claim 9, wherein the contact pad has a first thickness and the feature comprises a recess that extends into the contact pad a second thickness that is less than the first thickness.

11. The testing device of claim 9, wherein the first angle is parallel to a bottom probe surface of the bondingless ELG probe tip.

12. The testing device of claim 9, wherein the feature has multiple different varying depths extending into the contact pad.

13. The testing device of claim 9, wherein the first bottom surface is oriented at a non-zero angle with respect to the top surface and second bottom surface is parallel to the top surface.

14. The testing device of claim 13, wherein the first and second bottom surfaces converge at a transition sidewall surface.

15. The testing device of claim 9, wherein the feature is shaped to match a sidewall of the ELG probe tip.

16. A method comprising:
configuring a work piece with at least one contact pad having a feature;
engaging a first bottom surface of a first contact pad with a probe tip, the first bottom surface tapered at a greater than zero angle to provide varying depth for the feature relative to a top surface of the first contact pad; and
contacting a second bottom surface and a sidewall surface of the feature concurrently with the probe tip, the second bottom surface oriented at a different angle with respect to the top surface than the first bottom surface.

17. The method of claim 16, wherein the work piece has multiple contact pads each with a feature contacting a different probe tip.

18. The method of claim 17, wherein each contact pad has a differently configured feature.

19. The method of claim 17, wherein the probe tip continuously extends from a probe card.

20. The method of claim 19, further comprising monitoring a lapping operation on the work piece by logging the resistance of the probe tip.

* * * * *